(12) United States Patent
Tarnowski

(10) Patent No.: US 9,728,969 B2
(45) Date of Patent: Aug. 8, 2017

(54) SYSTEMS AND METHODS FOR GENERATING AN INERTIAL RESPONSE TO A CHANGE IN THE VOLTAGE OF AN ELECTRICIAL GRID

(75) Inventor: Germán Claudio Tarnowski, Virum (DK)

(73) Assignee: VESTAS WIND SYSTEMS A/S, Aarhus N (DE)

(*) Notice: Subject to any disclaimer, the term of this patent is extended or adjusted under 35 U.S.C. 154(b) by 248 days.

(21) Appl. No.: 13/149,054

(22) Filed: May 31, 2011

(65) Prior Publication Data

US 2012/0310426 A1    Dec. 6, 2012

(51) Int. Cl.

| G05D 3/12 | (2006.01) |
|---|---|
| G05D 5/00 | (2006.01) |
| G05D 9/00 | (2006.01) |
| G05D 11/00 | (2006.01) |
| H02J 3/24 | (2006.01) |
| F03D 7/02 | (2006.01) |
| H02J 3/38 | (2006.01) |
| H02P 9/10 | (2006.01) |

(52) U.S. Cl.
CPC .............. *H02J 3/24* (2013.01); *F03D 7/0272* (2013.01); *F03D 7/0284* (2013.01); *H02J 3/386* (2013.01); *H02P 9/105* (2013.01); *Y02E 10/723* (2013.01); *Y02E 10/763* (2013.01)

(58) Field of Classification Search
CPC ... H02J 3/24; H02J 3/386; H02P 9/105; F03D 7/0272; F03D 7/0284; Y02E 10/763; Y02E 10/723
USPC .......................................... 700/287, 90, 286
See application file for complete search history.

(56) References Cited

U.S. PATENT DOCUMENTS

| 7,750,490 B2* | 7/2010 | Scholte-Wassink ............ 290/44 |
| 8,332,077 B2* | 12/2012 | Kondo et al. ................. 700/287 |
| 2003/0011348 A1* | 1/2003 | Lof .......................... H02J 3/381 |
| | | 322/37 |

(Continued)

FOREIGN PATENT DOCUMENTS

EM    1790850 A1    5/2007

OTHER PUBLICATIONS

Inertial response of variable speed wind turbine by Johan Morren, IEEE dated Jan. 24, 2006.*

(Continued)

*Primary Examiner* — Ziaul Karim

(74) *Attorney, Agent, or Firm* — Patterson + Sheridan, LLP

(57) ABSTRACT

Systems, methods, and computer program products for providing an inertial response by a wind power system to power fluctuations in an electrical grid. The system includes a synthetic inertial response generator configured to generate a power offset in response to fluctuations in grid voltage. The power offset signal is generated by determining a quadrature component the grid voltage using an internal reference voltage having an angular frequency and phase angle that is synchronized to the electrical grid by a control loop. The quadrature component is used to determine a synchronous power level. A control loop error signal is produced by the difference between the synchronous power level and the wind turbine system power output. Changes in the grid frequency produce an error signal that is added to the power set point of wind turbine system output controllers to provide a power system inertial power output response.

14 Claims, 7 Drawing Sheets

(56) References Cited

U.S. PATENT DOCUMENTS

| | | | | |
|---|---|---|---|---|
| 2009/0326724 | A1* | 12/2009 | Lasseter et al. | 700/287 |
| 2010/0094474 | A1* | 4/2010 | Larsen et al. | 700/287 |
| 2010/0274401 | A1* | 10/2010 | Kjaer et al. | 700/287 |
| 2011/0074151 | A1* | 3/2011 | Burra | H02J 3/24 290/44 |

OTHER PUBLICATIONS

Grid connection requirements and solutions for DFIG wind turbine by Wei Qiao, IEEE dated Nov. 17-18, 2008.*

Rocabert J. et al., "Microgrid connection management based on an intelligent connection agent", IECON 36th annual conference on IEEE Industrial Electronics Society, Nov. 7, 2010.

Rocabert J., et al., "Intelligent control agent for transient to an island grid", Industrial Electronics 2010 IEEE International Symposium, Jul. 4, 2010.

Yun-Hyun Kim et al., "A fast and robust PLL of MCFC PCS under unbalanced grid voltages", Power Electronics Specifialists Conference, Jun. 15, 2008.

European Patent Office, International Search Report and Written Opinion issued in related International Application No. PCT/DK2012/050169 dated Aug. 20, 2012.

Tarnowski et al., "Study of variable speed wind turbines capability for frequency response", EWEC 2009 Scientific proceedings p. 190-193, EWEC, 2009.

Tarnowski et al., "Variable Speed Wind Turbines Capability for Temporary Over-Production", IEEE PES General Meetingp. 1-7, IEEE conference proceedings, 2009.

Wachtel et al., "Contribution of Wind Energy Converters with Intertia Emulation to frequency control and frequency stability in power systems", 8th International Workshop on Large-Scale Integration of Wind Power into Power Systems as well as on Transmission Networks for Offshore Wind Farms, Bremen (Germany) Oct. 14-15, 2009.

\* cited by examiner

SYSTEMS AND METHODS FOR GENERATING AN INERTIAL RESPONSE TO A CHANGE IN THE VOLTAGE OF AN ELECTRICIAL GRID

TECHNICAL FIELD

This application relates generally to power generation systems and, more specifically, to systems, methods, and computer program products for providing an inertial response from a wind power system to a change in the voltage of an electrical grid.

BACKGROUND

An alternating current (AC) electrical grid generally comprises of a network of synchronous machines coupled through a network of transmission lines which deliver the power generated by the synchronous machines to a plurality of customers. A synchronous machine of the type typically used to generate electrical power in an electrical grid includes a movable magnetic element, or rotor, and a number of stationary conductive coils comprising a stator. To generate electrical power, the rotor is coupled to a source of rotational power known as a prime mover and the stator is coupled to a load. Electrical power is provided to the load when the prime mover applies torque to the rotor, which causes the rotor to rotate relative to the stator. The motion of the rotor relative to the stator exposes the stator to a changing magnetic flux, which induces alternating currents in the stator and thereby provides electrical power to the load. The rotational power provided by the prime mover is thereby converted into electrical power at the output terminals of the synchronous machine, with the phase and frequency of the alternating current at the output terminals related to the angular velocity and position of the rotor.

The power exchange between the rotor and the stator of a synchronous machine also operates in reverse. If currents having a leading phase relationship with the rotor are produced in the stator by an external power source, such as by another synchronous machine operating as a generator, the changing magnetic flux produced by the stator may produce a torque moment in the rotor. The synchronous machine may thereby operate as either a generator converting rotational energy into electrical energy (generating mode), or as a motor converting electrical energy into rotational energy (motoring mode) depending on the relationship between the phase of the terminal voltage and the angular position of the rotor. Because of this relationship between rotor position and terminal voltage, when two synchronous machines are connected in parallel and operated as generators to power a common load, the frequency of the rotors will normally become synchronized by electrical interactions between the synchronous machines.

Electrical power generation in present day electrical grids is provided primarily by coupling multiple synchronous machine/prime mover combinations—or synchronous generators—to the grid in parallel. In a typical electrical grid, numerous synchronous generators are located at multiple power plants that utilize various sources of energy to power the prime movers. Examples of commonly employed prime movers include turbines motivated with steam produced by combustion of fossil fuels or heat from nuclear reactions, hydroelectric turbines, and gas fired turbines. The synchronous generators are operated at different geographic locations to provide power to the grid at multiple grid connection points. The collective load presented by the grid is thus much greater than the rated output of any individual synchronous generator. Because of this disparity in the capacity of a single synchronous generator and the capacity of the grid, a single synchronous generator will typically not have an appreciable effect on the grid frequency. The existing grid frequency will thus largely determine the angular velocity of the rotor of a synchronous generator connected to the grid.

When it is desired that the synchronous generator provide more power to the grid, the output of the prime mover is increased, which causes additional torque to be applied to the rotor of the synchronous machine. The increased torque urges the angular position of the rotor forward with respect to the phase of the terminal voltage stator field. The resulting increase in the load angle, also known as the displacement angle, between the internal voltage produced by the field current acting alone and the terminal voltage of the synchronous generator results in an increase in the power provided to the grid. The interrelationship between load angle and power output acts in combination with the kinetic energy stored in the rotating masses of the synchronous generators to impart an inherent flywheel effect to the grid.

The flywheel effect acts as a stability mechanism that contributes to safe and reliable operation of the grid by providing what is known as an inertial response to grid voltage transients. This inertial response is an inherent active power output response by the synchronous generators to grid transient conditions which helps maintain the power balance between the total grid consumption and the total power supplied to the grid. For example, a sudden increase in the load on the grid will typically result in a drop in the frequency of the voltage at the terminals of the synchronous generator, which will initially cause an increase in the load angle. The immediate results of the increase in the load angle include: (1) an increase in the restraining torque provided by the rotor; and (2) an increase in the instantaneous power output of the synchronous generator. The increased restraining torque will oppose the torque supplied by the prime mover and cause the rotor to decelerate so that the load angle begins decreasing back toward its pre-event value. However, the rotational inertia of the synchronous generator will limit the angular acceleration of the rotor, which limits the rate at which the load angle changes as the kinetic energy stored in the synchronous generator is transferred to the grid. Likewise, sudden decreases in grid load may result in a decreased load angle, dropping the instantaneous synchronous generator output and resulting in excess power production being absorbed by an increase in the kinetic energy stored in the rotating masses of the synchronous generator.

The rotating mass of the synchronous generator thus provides an inertial response that slows the rate of change in the grid frequency in response to sudden imbalances between load and production power. By releasing and storing kinetic energy from the rotating masses of the generator, synchronous generators increase grid stability and allow the prime movers time to respond to power imbalances. The larger the total rotating mass in the grid is relative to the change in power demand, the slower the grid frequency will change in response to the power imbalance. Therefore, grids linked with larger numbers of synchronous generators typically provide more stable frequency control by allowing prime mover governors and primary frequency controls more time to respond to changes in power demand.

Wind power generation is an alternative energy source for providing electrical power to the electrical grid. A wind power system may include one or more wind turbines, with a typical wind power system comprising a wind farm having multiple wind turbines ganged together to provide power to the grid at a common location. Wind turbines are typically operated to produce the maximum amount of electrical power possible under the existing wind conditions, which may allow other prime movers connected to the grid to be throttled back to conserve energy. To maximize the aerodynamic efficiency of the wind turbine, the wind turbines is typically operated at an optimal tip speed to wind speed ratio. Because wind speed typically varies considerably over the operating range of the wind turbine, maximizing the aerodynamic efficiency of the wind turbine will cause the rotor speed to vary with wind speed.

To compensate for rotor speed variations, wind turbines are typically coupled to the grid through electronic power converters so that the wind turbine generator may rotate with an angular speed independent of the grid frequency. Electronic power converters convert the variable frequency power produced by the wind turbine into power that is synchronized with the grid voltage. Conventional controllers for electronic power converters are typically designed to cause the converter to transfer power to the electrical grid at a rate that maximizes the instantaneous power output of the wind turbines connected to the converter. Because conventional power electronic converters do not provide an inherent active power response like a synchronous machine, wind turbine power generation systems utilizing conventional power converter controllers do not contribute to the stability of the grid. Thus, transient power imbalances in the grid must be compensated for by the remaining synchronous generators in the power system.

As the demand for wind power increases, the inertial response provided by synchronous generators unrelated to wind turbines will diminish as the total amount of kinetic energy stored in the grid will be less relative to the total capacity of the grid. As a consequence, grid frequency stability may be degraded with increasing wind power penetration into the electrical grid. Faster and larger grid frequency variations can thus be expected as wind power becomes more prevalent, resulting in associated reductions in the stability and reliability of the entire power system.

Thus, there is a need for improved systems, methods, and computer program products for controlling how wind power systems provide power to the grid that maintain the reliability and stability of the electrical grid and allow increased wind power system penetration.

SUMMARY

To address these and other shortcomings of conventional systems, methods and systems for controlling power output from a wind power system are provided.

In one embodiment, a method of controlling the power output from a wind power system is provided that includes monitoring the grid voltage at a connection point and generating an internal reference voltage having an angular frequency and a phase angle. The method further includes comparing the phase angle of the grid voltage to the phase angle of the internal reference voltage to generate a quadrature component of the grid voltage and generating a synthetic inertial response based on the quadrature component of the grid voltage. The method further includes adjusting a set point for the power output from the wind turbine system that includes the synthetic inertial response as a component.

In another embodiment, a method of generating a synthetic inertial response from a wind power system is provided that includes sampling a voltage of an electrical grid at a connection point and generating an internal reference voltage having an angular frequency and a phase angle. The method further includes synchronizing the phase of the internal reference voltage to the phase of the grid voltage using a control loop and adjusting a power output of the wind power system using an error signal generated by the control loop.

In still another embodiment, a system for providing power to an electrical grid is provided that includes one or more wind turbine systems, each of the wind turbine system having a rotor, a generator connected with the rotor, and a power converter coupling the generator of the wind turbine with the electrical grid. The power converter may be configured to transfer at least a part of the generated power between the wind turbine and the electrical grid. The system further includes a central controller operatively configured to generate a synthetic inertial response signal and to adjust the amount of power transferred between the wind turbine systems and the electrical grid based at least in part on the synthetic inertial response signal.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Generally, the embodiments of the invention are directed to wind turbine power generation systems and other power sources that rely on voltage conversion to transfer electrical power to the grid. To improve the impact of a wind turbine power system on grid stability, a synthetic inertial response is determined and provided to a voltage conversion controller. Under steady state conditions, the value of the inertial response may be zero, so that the voltage conversion controller works in a conventional manner to transfer maximum wind power to the grid. In response to grid voltage fluctuations, the synthetic inertial response value becomes non-zero, which causes the output of an inertial response controller to produce an inertial response reference signal. The inertial response reference signal may cause the power output controller to adjust the output power of the wind turbine system in opposition to the grid voltage fluctuations. To this end, the grid voltage is monitored and compared to an internal reference voltage having an angular velocity and phase angle, which is generated by a control loop having a step response function that provides a desired inertial response.

Under steady state conditions, the angular velocity of the internal reference voltage is equal to the grid frequency, which produces an inertia response value of zero. When a large power imbalance occurs in the grid, the phase angle of the grid voltage deviates from that of the internal reference voltage, which causes a non-zero synthetic inertia response signal to be generated in the control loop. The synthetic inertial response signal is used to generate an inertial response reference signal, which is added to the power set point of the voltage converter control system. The output power of the voltage converter is thus modulated by the inertial response reference signal. The voltage converter controller thereby extracts power from the reservoir of energy contained in the rotational inertia of the wind turbine system to generate an output response opposing the grid voltage fluctuation. Converter control systems including the inertial response feature may thereby improve grid stability by causing the wind turbine system output to respond to grid transients in a manner that reduces the grid voltage fluctuation.

Figure 1:
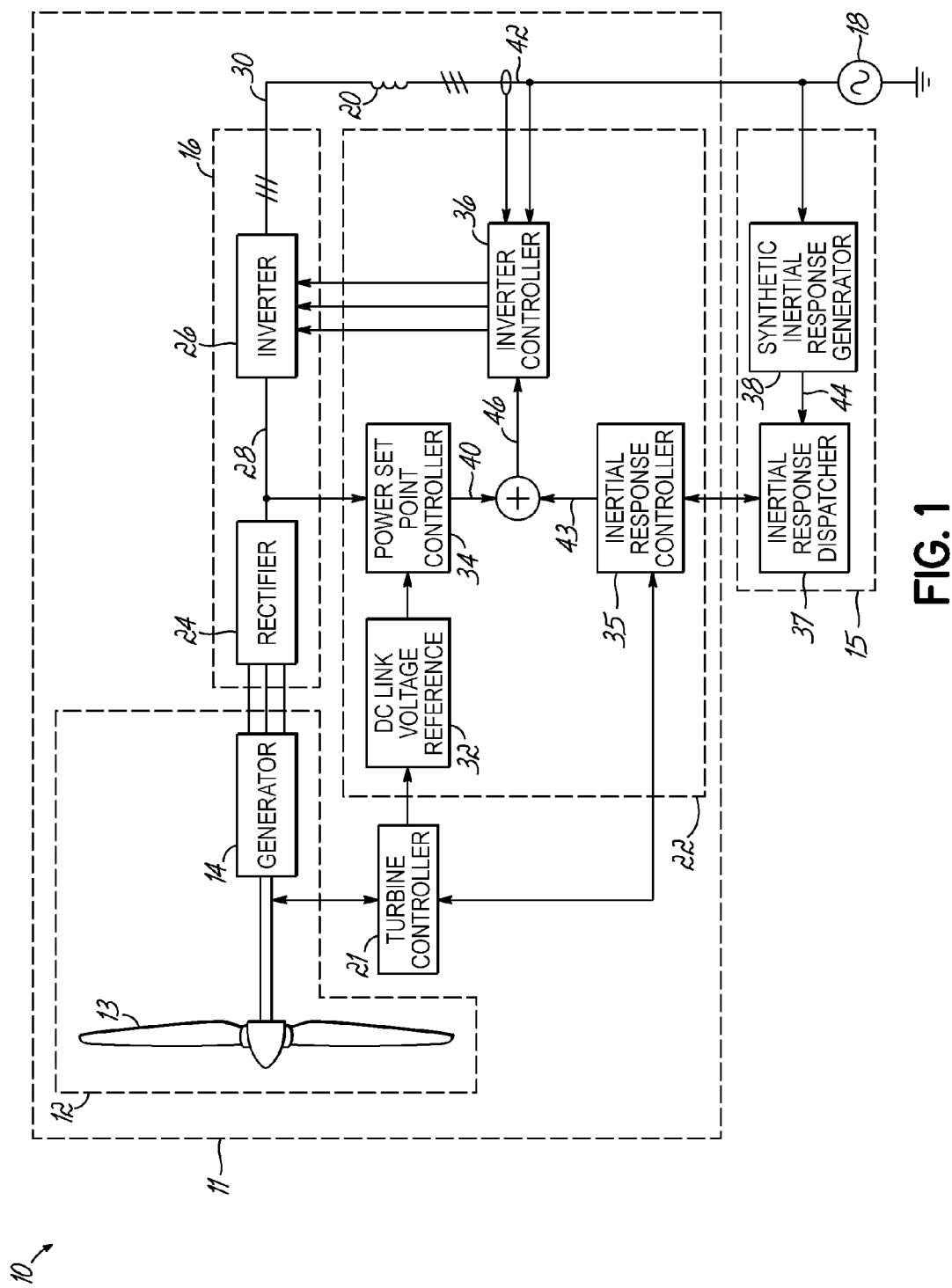
FIG. 1 is a block diagram of a wind turbine generator connected to an electrical grid by a voltage converter circuit with a control system including a central controller and an inertial response controller in accordance with an embodiment of the invention.

With reference to FIG. 1, a wind power system 10 may include one or more wind turbine systems 11 and a central controller 15. The representative wind turbine system 11 may include a wind turbine 12, a power converter 16 electrically coupled to an electrical grid 18 by one or more filter inductors 20, a turbine controller 21, and a power output controller 22. The wind turbine 12 includes a rotor 13 that converts wind energy into rotational energy that is operatively coupled to a generator 14, which converts the rotational energy supplied by the rotor 13 of wind turbine 12 into electrical energy.

In a typical wind turbine system 11, the turbine controller 21 is configured to monitor the speed of the rotor 13 and adjust the pitch of the rotor blades in response to existing wind conditions in order to maximize the output of the wind turbine system 11. When the wind speed exceeds the cut-in speed for the wind turbine 12, the rotor 13 of wind turbine 12 may begin to rotate, which may allow the wind turbine system 11 to begin delivering power. From the cut-in speed up to the rated wind speed, the turbine controller 21 may be configured to set the wind turbine blade pitch to maximize the wind turbine power coefficient, thereby converting the maximum amount of aerodynamic energy into rotational energy at the generator 14. Once the rated wind speed has been reached, the turbine controller 21 may be generating electricity at the maximum rated power of the wind turbine 12. From this point on, as the wind speed increases further the turbine controller 21 may adjust the blade pitch to maintain the speed and torque applied to the generator 14 at the rated levels. Finally, when the wind speed reaches the cut-out or furling speed, the turbine controller 21 may feather the blades to prevent damage to the wind turbine system 11.

The turbine controller 21 may also provide information on the rotational speed of the wind turbine 12 to the power output controller 22. Based on the rotational speed of wind turbine 12, the power output controller 22 may adjust the power provided to the grid 18, thereby varying the restraining torque provided to the wind turbine 12 by the generator 14. The steady state output of the wind turbine system 11 is thus largely determined by wind conditions rather than the demand for electricity by the grid 18.

The generator 14 will typically be either a synchronous machine or a variable speed doubly-fed induction generator that provides 3-phase alternating current (AC) electrical power to the power converter 16. If the generator 14 is a synchronous machine, the stator windings of the generator 14 will feed the power converter 16 directly as shown in FIG. 1. If the generator 14 a variable speed doubly-fed induction generator, the rotor windings will typically be coupled to the converter 16 and the stator windings will be coupled to the electrical grid 18. In either case, the power converter 16 will control how much power is transferred to the grid 18.

The power converter 16 may include a generator side converter in the representative form of a rectifier 24 coupled by a direct current (DC) link 28 to a grid side converter in the representative form of an inverter 26. The rectifier 24 may be a load-commuted rectifier (i.e., a diode or thyristor rectifier), or an inverter having a controller configured to operate the inverter as a rectifier, which might allow power to be transferred from the DC link 28 to the wind turbine 12 so that the wind turbine 12 can be operated in a motoring mode. The DC power produced by the rectifier 24 is electrically coupled to the DC link 28 and will typically include positive and negative voltages, one of which may be coupled to ground. The DC link 28 may include a positive voltage rail and a negative voltage rail (not shown), and is configured to deliver the DC power generated by the rectifier 24 to the inverter 26.

The power output controller 22 and inverter 26 may work in combination to function as a current source for the grid 18. To this end, the inverter 26 may be a three-phase inverter comprised of three single-phase inverters, with the output 30 of each single-phase inverter connected to one of three grid voltage phases, $V_a$, $V_b$, or $V_c$, which are diagrammatically represented in FIG. 1 by a single line of voltage V. Each single-phase inverter may include two electrical valves stacked in a vertical pair, such as two insulated gate bipolar transistors (IGBT) with the emitter of the top IGBT electrically coupled to the collector of the bottom IGBT to form a single-phase inverter output.

To complete the connection between the DC voltage link and the output of the single-phase inverter, the top valve (e.g., the collector of the top IGBT) may be electrically coupled to the positive rail of the DC link 28 and the bottom valve (e.g., the emitter of the bottom IGBT) may be electrically coupled to the negative voltage rail of the DC link 28. The positive and negative voltage rails of the DC link 28 may thereby be selectively coupled to the output 30 of inverter 26 by applying suitable control voltages to the valves (e.g., the bases of the IGBTs) to produce an AC signal having a desired phase and frequency at the output 30 of the inverter 26.

Because the grid 18 and inverter 26 both operate as stiff voltage sources, each phase of the output 30 of inverter 26 may be electrically coupled with a connection point 42 to grid 18 by a respective one of the filter inductors 20 or other suitable grid filter circuit. To provide AC power to the grid 18, the control voltage inputs of the inverter 26 may be electrically coupled to the power output controller 22. The power output controller 22 may be configured to drive the inverter 26 so that the inverter 26 provides an output voltage $E_i$ having a desired load angle $\delta$ with respect to the grid voltage V at the connection point 42 based on the voltage of the DC link 28 and the grid voltage V. The power output controller 22 may thereby control the amount of power $P_i$ supplied by the wind turbine system 11 to the grid 18 according to the equation:

$$P_i = E_i \times V \times \sin(\delta)/X_L$$

where $X_L$ is the reactance of the filter inductor 20 coupling the output 30 of inverter 26 to the grid 18, and $\delta$ is the load angle between the output voltage $E_i$ and grid voltage V.

The power output controller 22 may include a voltage reference 32 for the DC link 28, a power set point controller 34, an inertial response controller 35, and an inverter controller 36. The power set point controller 34 may be operatively coupled to the DC link 28 and the DC link voltage reference 32, and outputs a power set point signal 40 that controls the wind turbine system output power based on the voltage of DC link 28 and the output of the DC link voltage reference 32. The DC link voltage reference 32 may output a constant DC voltage, or the output of the voltage reference 32 may be adjusted based on information supplied by the turbine controller 21, such as the angular speed $\omega_t$ and torque $\tau$ at the shaft of the wind turbine rotor 13. To this end, the power set point controller 34 may compare the output of the voltage reference 32 to the voltage on the DC link 28 and adjust the power set point signal 40 accordingly. Typically, the DC link voltage reference 32 and power set point controller 34 are configured to supply a power set point signal 40 to the inverter controller 36 that causes the output power of the inverter 26 to track the power output of the wind turbine 12. The power set point controller 34 may thereby be configured to match the power delivered to the grid to the available wind power so that the steady state power output of the wind turbine system 11 may be maximized for the available wind conditions. The inertial response controller 35 may generate a power offset signal 43 in response to signals received from the central controller 15 as will be described in more detail below. The power offset signal 43 is added to the power set point signal 40 to produce a power level set point signal 46, which may produce an inertial response by the wind turbine system 11.

Figure 2:
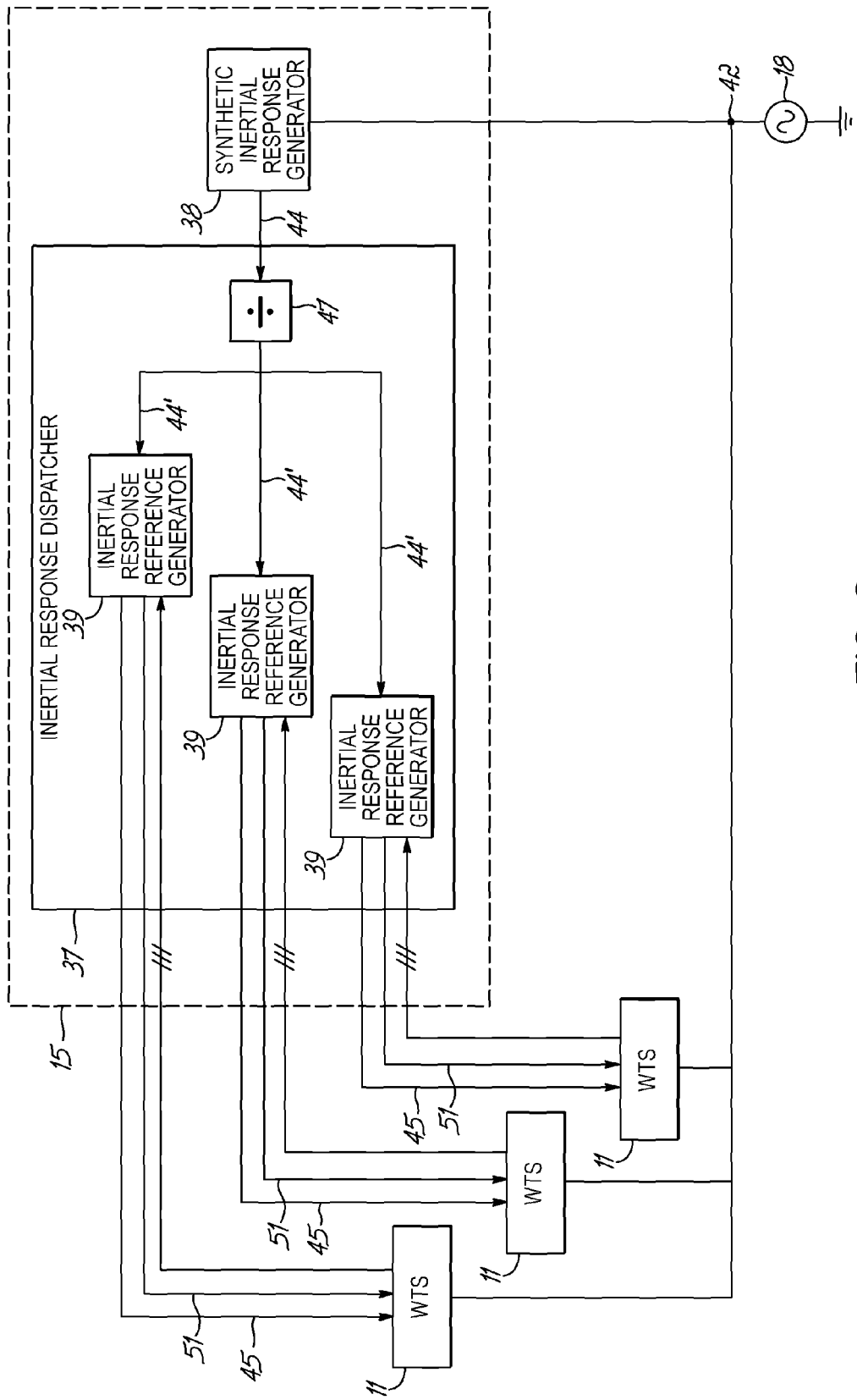
FIG. 2 is a block diagram illustrating details of the central controller illustrated in FIG. 1 in accordance with an embodiment of the invention.

With reference to FIG. 2, the central controller 15 is illustrated in a wind power system deployment having multiple wind turbine systems 11. The central controller 15 may include an inertial response dispatcher 37 and a synthetic inertial response generator 38, which may be operatively coupled to the connection point 42 of the grid 18. Based on the voltage at the connection point 42, the synthetic inertial response signal generator 38 generates a synthetic inertial response signal 44 representing a desired inertial response for the wind power system 10. The synthetic inertial response signal 44 is thus scaled based on the total power output capacity of the wind power system 10. The inertial response dispatcher 37 may include a divider 47 and one or more inertial response reference generators 39, with one inertial response generator 39 assigned to each wind turbine system 11 operative within the wind power system 10. The synthetic inertial response signal 44 is coupled through the divider 47, which divides the synthetic inertial response signal 44 by the number of operative wind turbine systems 11 to produce synthetic inertial response signals 44' suitably scaled for use by a single wind turbine system. Each of the divided synthetic inertial response signals 44' may be processed by an inertial response reference signal generator 39 associated with a particular wind turbine system 11 to generate inertial response reference signal 45 specific to the associated wind turbine system 11. The inertial response reference generators may also provide an inertia flag signal 51, which will be discussed in more detail below.

The inertial response reference signal 45 is provided to the inertial response controller 35 to produce the power offset signal 43, which is added to the power set point signal 40. The sum of the power set point signal 40 and the power offset signal 43 may provide a power level set point signal 46 for the inverter controller 36, which may adjust the load angle $\delta$ of the inverter output voltage $E_i$ accordingly to provide the desired power to the grid 18. Under steady state grid conditions, the power offset signal 43 will typically be zero so that each of the wind turbine systems 11 is controlled in an essentially conventional manner in which the output power of the wind turbine system 11 is determined solely by the power set point signal 40.

So that the power output controllers 22 provide an inertial response to changes in grid voltage, the synthetic inertial response signal generator 38 may be configured to produce a signal that emulates the response of a synchronous machine to changes in grid frequency. A synchronous machine generating electricity on the grid will have an internal voltage $E_a$ produced in the armature by the field current acting alone that leads the grid voltage V by a load angle $\delta$ that is related to the power being transferred to the grid 18 from the synchronous machine. Resolving the grid voltage V into direct and quadrature components $V_d$, $V_q$ using a reference frame having a d-axis aligned with the internal voltage $E_a$ provides the following relationships between the grid voltage V, the direct component of the grid voltage $V_d$, the quadrature component of the grid voltage $V_q$, and the load angle $\delta$:

$$V = (V_d^2 + V_q^2)^{1/2}$$

and $$\sin(\delta) = V_q/(V_d^2 + V_q^2)^{1/2}.$$

Substituting $V_q/(V_d^2 + V_q^2)^{1/2}$ for $\sin(\delta)$ in the equation for calculating the power output of the synchronous machine allows the generator power output $P_{el}$ to be represented by the following equation:

$$P_{el} = V_q(E_a/X_S)$$

where $X_S$ is the synchronous reactance of the synchronous machine. The power output of the synchronous machine is thus proportional to the magnitude of the quadrature component $V_q$ of the grid voltage with respect to the internal voltage $E_a$.

When the frequency of the grid 18 fluctuates, such as when there is a load imbalance between the production and consumption of electricity on the grid 18, the change in the phase of the internal voltage $E_a$ of the synchronous machine may be delayed relative to the change in the phase of the terminal voltage V. This delay may be attributed to the rotational momentum or inertia of the rotor of the synchronous machine. The rotational inertia of the rotor of the synchronous machine provides a restraining torque in opposition to the angular acceleration in the rotor of the synchronous machine produced by the change in the grid voltage frequency V. The angular velocity of the rotor of the synchronous machine is thus prevented from changing instantaneously, so that the reference frame defined by the internal voltage $E_a$ is initially unchanged in response to the grid voltage fluctuation.

The load angle δ between the internal voltage $E_a$ and grid voltage V thus varies in response to changes in phase of the grid voltage V. This change in the load angle δ, as represented by a change in the magnitude of $V_q$, causes the output power of the synchronous machine to change in response to grid fluctuations. The power output of the synchronous machine after the grid event may be represented as:

$$P_{el} = P_0 + \Delta P_{inertia} = (E_a/X_S) \times V_{q0} + (E_a/X_S) \times \Delta V_q$$

where $P_0$ represents the pre event output power of the synchronous machine, $\Delta P_{inertia}$ represents the change in output power resulting from the grid event, $V_{q0}$ represents the pre-event value of $V_q$, and $\Delta V_q$ represents the change in $V_q$ resulting from the grid event. The change in output power, or inertial response $\Delta P_{inertia}$ of the synchronous machine may thus be represented by:

$$\Delta P_{inertia} = V_q \times (E_a/X_S) - P_0.$$

The inertial response $\Delta P_{inertia}$ of the synchronous machine represents a power transfer between the kinetic energy stored in the rotor of the synchronous machine and the electrical energy in the grid 18. The power transfer is thus related to changes in the rotational inertia stored in the synchronous machine, with reductions in rotational inertia (i.e., slowing of the rotor) resulting from power being transferred from the rotor of the synchronous machine to the grid 18. As the synchronous machine is brought back into synchronization with the grid 18 over a period of time following the grid event, the angular velocity of the rotor of the synchronous machine is decreased or reduced by this power transfer until the internal voltage $E_a$ of the synchronous machine matches the grid frequency. The inertial response $\Delta P_{inertia}$ of the synchronous machine to step changes in the grid voltage V is thus a product of changes in the rotational inertia stored in the synchronous machine. This inertial response $\Delta P_{inertia}$ provides an inherent stabilizing effect to the grid 18 by compensating for transient load imbalances in the grid 18.

It has been determined that a synthetic inertial response signal that emulates the inertial response produced by a synchronous machine may be generated by a control loop having a damping ratio and an undamped natural frequency configured to model the step response of a synchronous machine. Moreover, because the system parameters of the control loop are fully adjustable, the control loop is not limited to producing an inertial response similar to that of a synchronous machine. The inertial response feature may thereby provide wind power system designers with the ability to tune the inertial response of the wind power system according to a desired performance based on local grid conditions and requirements, which may differ from that provided by synchronous machine. By appropriately coupling this synthetic inertial response signal to the power output controllers 22 of the wind turbine systems 11, the inertial response feature of the central controller 15 may be able to improve the grid stability provided by the wind power system 10 as compared to wind power systems having conventional controllers.

Figure 3:
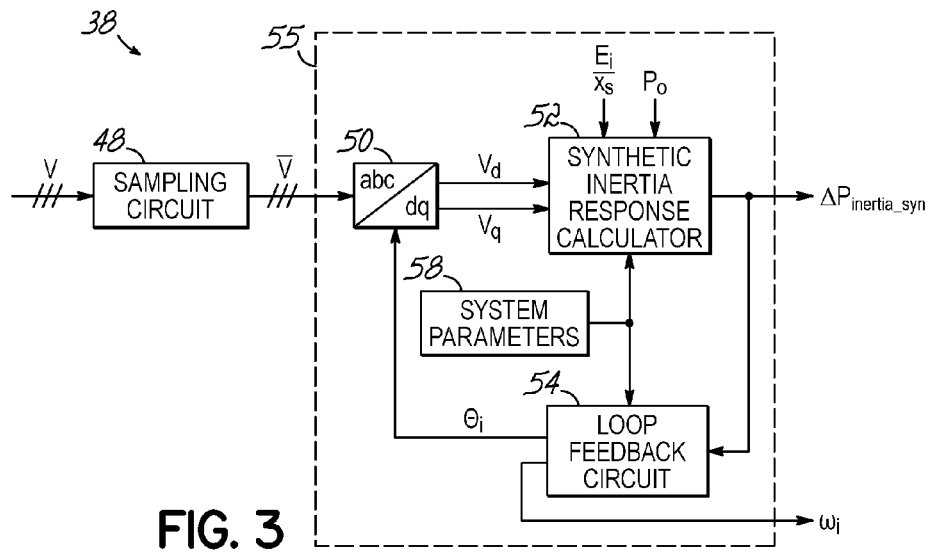
FIG. 3 is a block diagram illustrating details of the synthetic inertial response signal generator illustrated in FIGS. 1 and 2 in accordance with an embodiment of the invention.
Figure 4:
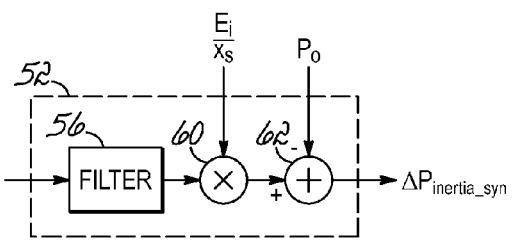
FIG. 4 is a block diagram of the synthetic inertia response calculator block from FIG. 3 in accordance with an embodiment of the invention.
Figure 5:
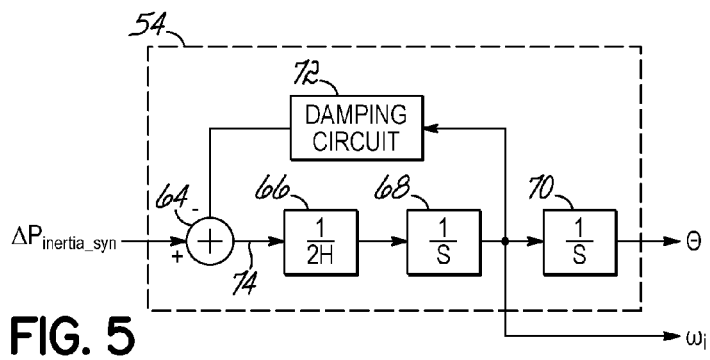
FIG. 5 is a block diagram of the loop feedback circuit from FIG. 3 in accordance with an embodiment of the invention.

With reference to FIGS. 3-5 in which like reference numerals refer to like features and in accordance with an embodiment of the invention, the synthetic inertial response signal generator 38 includes a grid voltage sampling circuit 48 and a control loop 55 that includes a direct/quadrature (D/Q) transformation circuit 50, a synthetic inertial response calculator 52, and a loop feedback circuit 54. The operational characteristics of the synthetic inertial response calculator 52 and loop feedback circuit 54 may be adjusted by setting the values of system parameters 58 so that the control loop 55 has a desired step function response. The system parameters 58 may thereby provide a means by which to tune the performance of the synthetic inertial response signal generator 38.

To provide a system input signal, the instantaneous grid voltage is filtered and sampled by the sampling circuit 48, which provides the sampled signal to the D/Q transformation circuit 50. The sampled signal may be an analog signal, but may more typically be in a digital form suitable for use by a processor or other computing device. The D/Q transformation circuit 50 transforms the grid voltages into their quadrature $V_q$ and direct $V_d$ components with respect to an internal reference voltage having an angular speed or frequency $\omega_i$ and a phase angle $\theta_i$. The phase angle $\theta_i$ of the internal reference voltage is provided to the D/Q transformation circuit 50 by the loop feedback circuit 54, so that the control loop 55 may essentially function as a phase locked loop (PLL) that tracks the angular frequency $\omega_g$ of the voltage on the grid 18. Under steady state conditions, the angular frequency of the grid $\omega_g$ and the angular frequency of the internal reference voltage $\omega_i$ will thus be approximately equal, which results in a generally constant phase relationship between the internal reference voltage and the grid voltage V.

The synthetic inertial response calculator 52 may include a filter 56, a multiplier circuit 60, and a summing circuit 62. The D/Q transformation circuit 50 provides the quadrature and direct voltage components $V_q$, $V_d$ to the synthetic inertial response calculator 52, which determines the synthetic inertial response $\Delta P_{syn\_inertia}$. To this end, the quadrature component of the grid voltage $V_q$ may be processed by a filter 56 to remove noise and adjust the frequency response of the control loop 55. That is, the frequency response of filter 56 may be selected not only for removing noise, but to also provide the filtered $V_q$ with a desired dynamic or time constant for shaping the synthetic inertial response $\Delta P_{syn\_inertia}$.

The conditioned quadrature voltage at the output of the filter 56 may be provided to the multiplier circuit 60 and multiplied by a synchronous reactance power quotient K. For the purposes of illustration, the synchronous reactance power quotient K may be equal to the quotient of an output voltage $E_a$ divided by a synchronous reactance $X_S$ (or $E_a/X_S$) of a synchronous machine having a desired inertial response. The control loop 55 may thereby be tuned to emulate the inertial response of an arbitrary synchronous machine. However, it is understood that the synchronous reactance power quotient K is essentially a gain constant that determines the sensitivity of the inertial response calculator to changes in the phase angle of the grid voltage V. The product of the conditioned quadrature voltage $V_q$ and the synchronous reactance power quotient K thus provides a system parameter which may be tuned to obtain a desired wind power system inertial response. The values $E_a$ and $X_S$ thus do not need to be measured or obtained and will typically be programmed values. The sensitivity may thus be tuned independently of the grid voltage/impedance and may be set according to the desired inertial response performance without need to measure $E_a$ or $X_S$ or model the response of a synchronous machine.

Once again for the purposes of illustration, to provide an inertial response that emulates a synchronous machine, an inertial response power reference point P may be set equal to the steady state, or pre-event output power $P_0$ of the wind turbine system 10. The inertial response power reference point P may be subtracted from the output of the multiplier circuit 60 (i.e., the synchronous power output) to produce the synthetic inertial response $\Delta P_{inertia\_syn}$ so that:

$$\Delta P_{inertia\_syn} = V_q \times (E_d/X_S) - P_0.$$

However, as with the synchronous reactance power quotient K, the inertial response power reference point P is another control loop parameter that may be set independently of the actual pre-event output power $P_0$. The inertial power reference point P may also be set as a fraction or other multiple of the pre-event output power $P_0$ to produce a desired $\Delta P_{inertia\_syn}$ response. Because the control loop 55 produces a static phase relationship between the internal reference voltage and the grid voltage under steady state conditions, $\Delta V_q$ will normally equal zero. Thus, under steady state conditions the synthetic inertial response $\Delta P_{inertia\_syn}$ produced by the synthetic inertial response signal generator 38 is zero. That is, the phase angle $\theta_i$ of the internal voltage reference will settle at a value that produces a $V_q$ such that the product of $V_q$ and K is equal to the inertial power reference point P.

To close the control loop, the synthetic inertial response $\Delta P_{inertia\_syn}$ is provided to the input of the loop feedback circuit 54, which includes a summing circuit 64, a loop gain circuit 66, a first integrator circuit 68, a second integrator circuit 70, and a damping feedback circuit 72. As will be understood by a person having ordinary skill in the art of control system design, the synthetic inertial response $\Delta P_{inertia\_syn}$ is essentially an error signal produced by the difference between the inertial response power reference point P and the synchronous output power $V_q \times K$ of the wind power system 11 as modeled by the synthetic inertial response calculator. Because the power output of the wind turbine system 10 is related to the load angle δ between the output voltage $E_i$ of the inverter 26 and the voltage V of the grid 18, the synthetic inertial response $\Delta P_{inertia\_syn}$ may be used to provide a signal related to the phase error between the internal reference voltage and the voltage V of the grid 18.

The control loop 55 may thereby cause the internal reference voltage to track the grid voltage V using the synthetic inertial response $\Delta P_{inertia\_syn}$ as an input signal to the loop feedback circuit 54. To this end, a feedback signal generated by the damping feedback circuit 72 is subtracted the synthetic inertial response $\Delta P_{inertia\_syn}$ in the summing circuit 64 to produce a difference signal 74. The difference signal 74 may be multiplied in the loop gain circuit 66 by a gain constant (½H) to generate a gain adjusted difference signal, and the gain adjusted difference signal provided to the first integrator circuit 68. The output of the first integrator 68 of loop feedback circuit 54 may be the angular frequency $\omega_i$ of the internal reference voltage, which may be represented in the s-domain by the following equation:

$$\omega_i = (\Delta P_{inertia\_syn})/(2Hs+D)$$

where H is a synthetic inertia constant and D is the transfer function of the damping feedback circuit 72. The phase angle $\theta_i$ of the internal reference voltage is determined by processing $\omega_i$ though the second integrator circuit 70. The phase angle $\theta_i$ of the internal reference voltage may thus be represented in the s-domain by the following equation:

$$\theta_i = (\Delta P_{inertia\_syn})/(2Hs^2+Ds).$$

The loop feedback circuit 54 may thereby cause the control loop 55 to produce a second order step response to changes in V having a damping ratio which may be controlled by a suitable transfer function D.

The calculated value of the synthetic inertial response $\Delta P_{inertia\_syn}$ may thereby be used to provide feedback to track the new grid voltage angle. The synthetic inertia constant H of loop gain circuit 66, the transfer function D of damping feedback circuit 72, and the transfer function of filter 56 may be set by the system parameters 58 to produce a step response. The step response maybe configured to model an inertial response that would be produced by a synchronous machine, or the step response may be configured to produce an inertial response according to a desired performance different than a synchronous machine. The step response may thereby be configured to take into consideration local power system stability needs as well as local grid conditions and requirements. The resulting inertia response may thereby provide improved grid stability as compared to the non-adjustable inertial response of a synchronous machine. For example, the transfer function D may be adjusted by the system parameters 58 to alter the damping factor of the control loop 55, which may allow tuning of the response of the control loop 55 to step changes in $V_q$ to control overshoot. The system parameters thereby provide a means to adjust the response of the synthetic inertial response signal generator 38 to changes in the angular frequency $\omega_g$ of the grid voltage V.

The synthetic inertial response signal generator 38 may thereby be tuned to provide a synthetic inertial response $\Delta P_{inertia\_syn}$ that may be summed with the power set point signal 40 to provide a wind turbine system output power response having characteristics which may be superior to that of a synchronous machine. The power set point signal 40 may also reflect other standard functionalities of the wind power system 10 or wind turbine system 11. For example, the synthetic inertial response may be used to modify the power set point signal 40 in conjunction with other control actions modifying the power set point signal 40, such as standard active power control or primary frequency control that are summed with the power set point signal 40.

Unlike a synchronous machine having an output which may be adjusted to meet changing demands from the grid 18 by simply changing the power delivery rate of the prime mover, at the time of a grid event the wind turbine system 10 will typically be delivering close to 100% of the available wind power to the grid 18 to maximize the amount of "green" power supplied to the grid 18. In order to insure that the output of the wind turbine system 10 complies with grid codes and to prevent the power output controller 22 from demanding greater power changes than can be tolerated by the wind turbine system 10, the synthetic inertial response $\Delta P_{inertia\_syn}$ may be further processed to generate the inertial response reference signal 45 that is used to produce the power offset signal 43.

Figure 6:
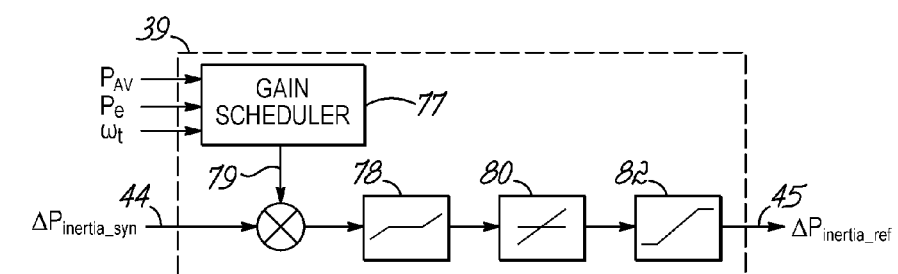
FIG. 6 is a block diagram of the inertial response reference signal generator illustrated in FIG. 2 in accordance with an embodiment of the invention.

Referring now to FIG. 6 in which like reference numerals refer to like features in FIGS. 1-4 and in accordance with an embodiment of the invention, the scaled synthetic inertial response signal $\Delta P_{inertia\_syn}$ 44' may be provided to the inertial response reference signal generator 39, which may include one or more of a gain scheduler 77, a dead band controller 78, an output power ramp rate limiter 80, and an output power absolute level limiter 82. The components of the inertial response reference signal generator 39 may work cooperatively to prevent large changes in the grid voltage V from producing an inertial response reference signal $\Delta P_{inertia\_ref}$ 45 that would cause the power output of the wind turbine system 10 to violate grid codes, cause the wind turbine 12 speed or torque to exceed design limits, or result in an output power that exceeds the design limits of the power converter 16.

The gain scheduler 77 may provide a reduction or a conditioning of the inertia response signal supplied to individual wind turbine systems 11 according to the actual amount of kinetic energy stored in the turbine rotor 13. To this end, the available wind power ($P_{AV}$), the current electrical power output of the wind turbine 12 ($P_e$), and angular speed of the wind turbine rotor 13 ($\omega_t$) may be provided to the gain scheduler 77. Based on these input parameters, the gain scheduler 77 may generate a gain signal 79 which is applied to the scaled synthetic inertial response signal $\Delta P_{inertia\_syn}$ 44'. The gain scheduler 77 may thereby provide a mechanism whereby the inertial response of each wind turbine system 11 may be adjusted based on current wind speed, stored rotational energy, and current output power of the individual wind turbine 12. The gain scheduler 77 may be used to adjust the rate at which energy is transferred from the kinetic energy stored in the rotor 13 of the wind turbine 12 to the electrical grid 18 during a load imbalance. By way of example, the gain scheduler 77 might be configured to reduce the inertial response provided by the wind turbine system 11 when the wind turbine system 11 is operating with low wind speed. This adjustment might allow the wind turbine system 11 to provide an inertial response of sufficient duration to aid the stability of the electrical grid 18 before the angular velocity of the wind turbine rotor 13 drops below a minimum allowable operational value $\omega_{min}$. The gain signal 79 provided by the gain scheduler 77 may thus reflect the actual capability of the wind turbine 12 to deliver an inertial response based on actual wind turbine conditions such as available wind power, actual power production, and/or actual turbine speed.

The dead band controller 78 may provide a signal range or band where the synthetic inertial response signal 44 has no effect on the inertial response reference signal 45—i.e., a band where the system response is dead. The signal range of the dead band controller 78 may be set at a suitable level to prevent undesirable inertial response activation-deactivation cycles in response to minor grid power fluctuations. The dead band controller 78 may thereby reserve the kinetic energy stored in the wind turbine 12 for providing additional frequency stability to the grid 18 during significant power imbalances, such as an imbalance due to a lost power plant. The dead band controller 78 may also be implemented at the system level of the central controller (i.e., prior to distributing the synthetic inertial response signal $\Delta P_{inertia\_syn}$ 44 to the inertial response reference generators 39) so that the inertial response is activated in a coordinated manner on a wind power system level.

The ramp rate limiter 80 may be configured to limit the maximum rate of change in output power of the wind turbine system 10 due to large fluctuations in the grid voltage V. The ramp rate limiter 80 may thereby prevent changes in the output power of the wind turbine system 10 from exceeding the changes allowed by the grid code. The ramp rate limiter 80 may also prevent abrupt changes in the restraining torque produced by the generator 14, which might damage the wind turbine 12.

The absolute level limiter 82 may provide a cap on the maximum amount of power that can be sourced by the wind turbine system 10, which may further serve to prevent the power output of the wind turbine system from violating grid code rules, and/or prevent the power output from exceeding design limitations on the power converter 16 or other wind turbine system components.

Figure 7:
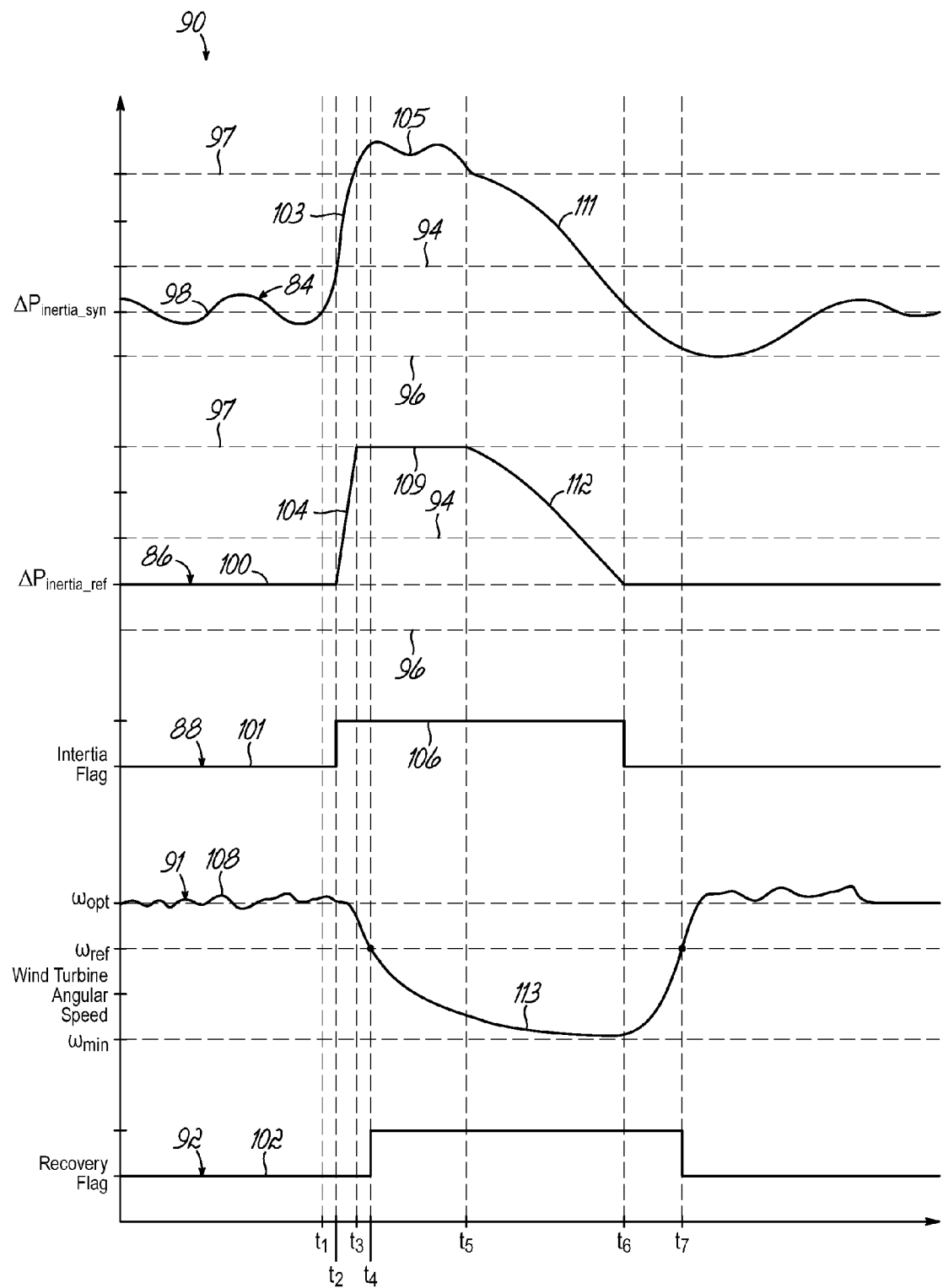
FIG. 7 is a graphical diagram illustrating the relationship between the synthetic inertial response signal, the inertial response reference signal, an inertia flag state, a recovery flag state, and the wind turbine rotor angular speed in accordance with an embodiment of the invention.
Figure 8:
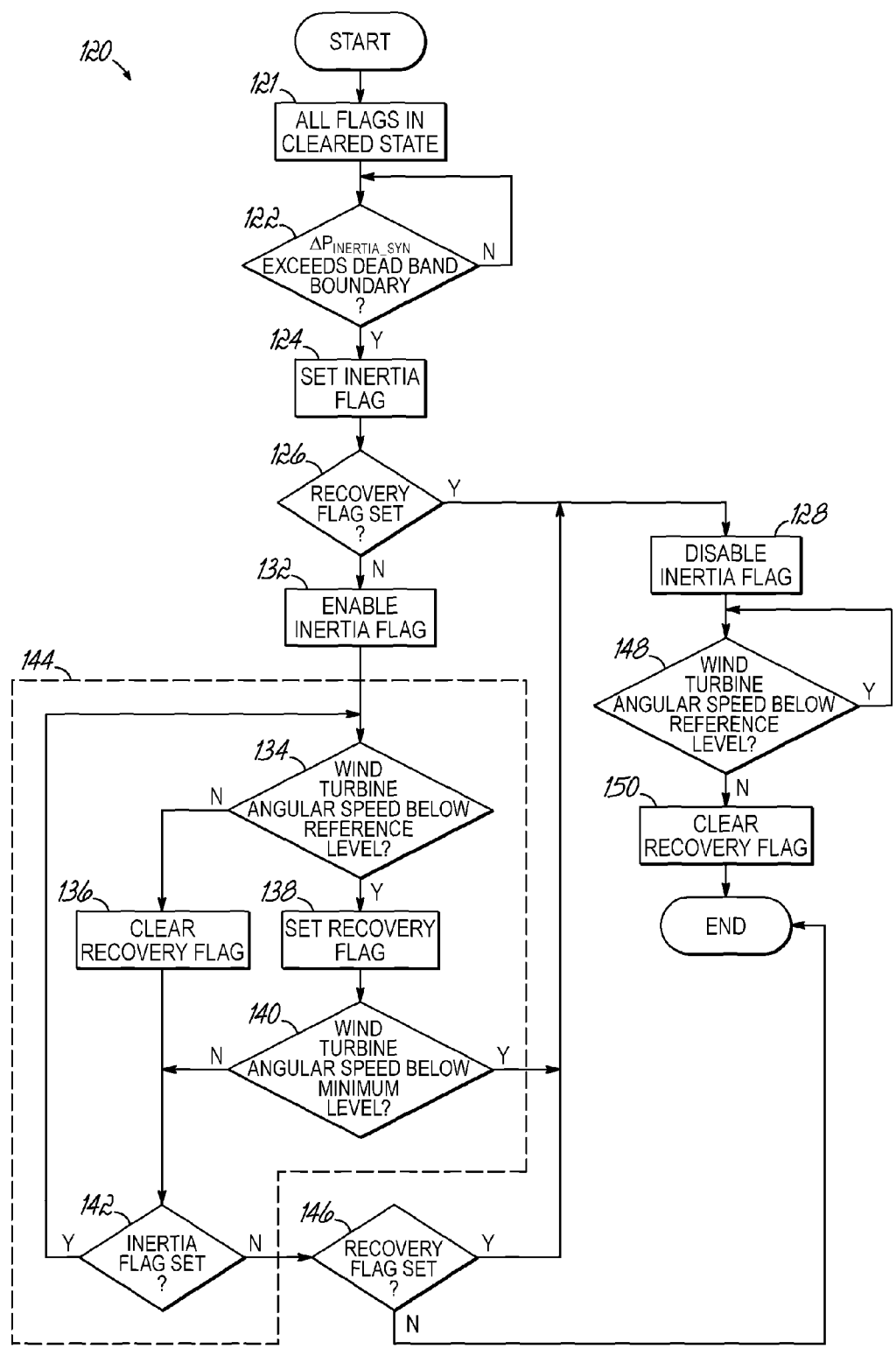
FIG. 8 is a flow chart illustrating the operation of the power output controller in accordance with an embodiment of the invention.

Referring now to FIGS. 7 and 8, a graphical diagram 90 illustrating exemplary relationships between the synthetic inertial response $\Delta P_{inertia\_syn}$ represented by plot line 84, the inertial response reference $\Delta P_{inertia\_ref}$ represented by plot line 86, an inertia flag state represented by plot line 88, the wind turbine angular speed $\omega_t$ represented by plot line 91, and a recovery flag state represented by plot line 92 is provided. The inertia flag is a system wide flag that provides an indication that the wind power system 10 is providing an inertial response to a power grid fluctuation. The recovery flag is a flag local to each wind turbine system 11 that provides the central controller 15 with an indication that a particular wind turbine system 11 has insufficient kinetic energy to provide an inertial response. The accompanying flow chart 120 illustrates a sequence of operations that may be used to set the operational state of the central controller 15 in response to the signals shown in the graphical diagram 90. The times ($t_x$) and vertical scales of the different plots of the graphical diagram 90 are intended to provide relative reference points for discussion purposes, but the graphs are exemplary only and are not intended to provide accurate absolute time or vertical scales. For purposes of clarity, the system responses will be discussed with reference to the control of a single wind turbine system 11. However, it is understood that the central controller 15 may control multiple wind turbine systems 11 independently in the same manner as described here for a single wind turbine system 11. It is further understood that the functions attributed to the central controller 15 might also be distributed between the central controller 15, power output controllers 22, and inertial response controllers 35, and that embodiments of the invention are not limited by how the functions are distributed.

In blocks 121 and 122 of flow chart 120, all the state flags in the central controller 15 may initially be in cleared state, as represented by segment 101 of inertia flag state 88 and segment 102 of recovery flag state 92, indicating that the wind turbine system 10 is generating power under normal operating conditions. The time between $t_0$ to $t_1$ may thus represent a period during which the voltage at the connection point 42 may be relatively constant and the angular speed $\omega_t$ of the wind turbine 12 may be at or near an optimum level $\omega_{opt}$ for existing wind conditions as indicated by plot line segment 108. During this period, the central controller 15 may monitor $\Delta P_{inertia\_syn}$, remaining in the block 122 loop. Because the fluctuations in the grid voltage frequency are insufficient to result in a value of $\Delta P_{inertia\_syn}$ that exceeds the either the dead band upper limit 94 or the dead band lower limit 96 between time $t_0$ and $t_1$, as represented by segment 98 of synthetic inertial response 84, the inertial response reference $\Delta P_{inertia\_ref}$ may remain at zero during the period as represented by segment 100 of the inertial response reference 86. Thus, under normal operating conditions, the power output of the wind power system 10 may be unaltered by the inertial response feature of the central controller 15.

At time $t_1$, the grid 18 may experience a significant power imbalance, such as might occur if a large load or a power plant is abruptly disconnected from or added to the grid 18. Although the power imbalance is shown as an increase in the power demand in FIG. 7, for purposes of this discussion it is understood that the imbalance could also result from a decrease in power demand, in which case the central controller 15 might respond by decreasing the power output of the wind turbine system 10. In response to the resulting frequency deviation in the voltage at the connection point 42, $\Delta P_{inertia\_syn}$ begins to increase with advancing time as represented by segment 103 of synthetic inertial response 84, and may pass through the dead band upper limit 94 at time $t_2$. In response to $\Delta P_{inertia\_syn}$ passing through the dead band upper limit 94, the central controller 15 may exit the $\Delta P_{inertia\_syn}$ monitoring loop ("Yes" branch of decision block 122).

In block 124, the central controller 15 may set the inertia flag state 88 in response to $\Delta P_{inertia\_syn}$ exceeding the upper dead band limit 94 at time $t_2$ by outputting an appropriate inertial flag signal 51 as represented by segment 106 of inertia flag state 88. The inertia flag may be a wind power system wide flag indicating that the grid 18 is experiencing a transient load imbalance event. Thus, the inertia flag state 88 may be provided by the inertial flag signal 51 to the inertial response controllers 35 for multiple wind turbines 12. The inertia flag state 88 may thus be a wind power system wide status indication that allows a coordinated synthetic inertial response to be provided by the wind turbine systems 11.

In block 126, the central controller 15 checks the status of the recovery flag state 92. The recovery flag may be maintained separately for each wind turbine 12 by the inertial response controller 35 or in the central controller 15 and provides an individual status indicator indicating if the angular speed $\omega_t$ of the wind turbine 12 is above a reference speed threshold $\omega_{ref}$. The reference speed threshold $\omega_{ref}$ represents an angular speed below which the wind turbine 12 may not have enough stored kinetic energy in the form of rotational momentum to provide an adequate inertial response to the grid event before dropping to the minimum allowable angular speed $\omega_{min}$.

If the recovery flag is set ("Yes" branch of decision block 126), the central controller 15 may proceed to block 128 where the inertia flag will be disabled for the wind turbine system 11 in question. The central controller 15 may then proceed to block 148 where the affected wind turbine system 11 is maintained in a recovery mode loop until $\omega_t$ once again equals or exceeds $\omega_{ref}$. The recovery flag may thereby be used to prevent the wind turbine system 11 from having to abruptly halt an inertial response shortly after the beginning of a grid event, which might harm rather than improve grid stability.

If the recovery flag is clear ("No" branch of decision block 126), the central controller 15 may proceed to block 132 and enable the inertia flag for the wind turbine system 11 in question. Once the inertia flag is enabled, the central controller 15 may enter an inertial response mode process loop 144 with regard to the wind turbine system 11 associated with that particular recovery flag. The central controller 15 may remain in process loop 144 until time $t_7$, as will be described below.

Thus, from time $t_2$ to $t_3$ the central controller 15 may begin outputting the inertial response reference signal $\Delta P_{inertia\_ref}$. As represented by segment 103 of the synthetic inertial response 84 and segment 104 of the inertial response reference 86, $\Delta P_{inertia\_syn}$ may exceed $\Delta P_{inertia\_ref}$ during this period so that $\Delta P_{inertia\_ref}$ is increased at a rate limited by the ramp rate limiter 80. At time $t_3$, $\Delta P_{inertia\_ref}$ may reach an absolute inertial response limit 97, which may be set by the absolute level limiter 82 of inertial response reference signal generator 39. Because $\Delta P_{inertia\_syn}$ remains above the absolute inertial response limit 97 between $t_3$ and $t_5$, as represented by segment 105 of synthetic inertial response 84, $\Delta P_{inertia\_ref}$ remains at the absolute inertial response limit 97 for the period as represented by segment 109 of inertial response reference 86. At time $t_5$, $\Delta P_{inertia\_syn}$ falls to the absolute inertial response limit 97 and continues to drop with advancing time until $\Delta P_{inertia\_syn}$ becomes negative at time $t_6$. Because the rate of change of $\Delta P_{inertia\_syn}$ between $t_5$ and $t_6$ is less than maximum slew rate allowed by the ramp rate limiter 80, $\Delta P_{inertia\_ref}$ may track $\Delta P_{inertia\_syn}$ over the period, as represented by segment 111 of synthetic inertial response 84 and segment 112 of inertial response reference 86. To avoid reducing the power output of the wind turbine system 10 below the pre-event level, $\Delta P_{inertia\_ref}$ will typically not track $\Delta P_{inertia\_syn}$ into negative territory and thus remains at zero beyond time $t_6$.

While the inertial flag is set and enabled, the power output controller 22 may freeze the power set point signal 40 at the pre-grid event level. By freezing the power set point signal 40, the power set point controller 34 may be prevented from adjusting the power set point signal 40 in an attempt to compensate for the non-zero $\Delta P_{inertia\_ref}$ component of the power level set point signal 46. The set and enabled inertial flag may also cause the power output controller 22 to disable the speed control functions of the turbine controller 21 so that changes in the angular speed of the turbine $\omega_t$ resulting from the transfer of stored kinetic energy from the wind turbine 12 to the grid 18 do not interfere with the synthetic inertial response of the wind turbine system 10. The set and enabled inertial flag may also cause the gain scheduler 77 to freeze the gain signal 79 to prevent unwanted changes in $\Delta P_{inertia\_ref}$ during the inertial response period.

As the output power of the wind turbine system 10 is increased above the pre-event power $P_0$ by the addition of $\Delta P_{inertia\_ref}$ to the power level set point signal 46, the voltage of the DC link 28 may begin to droop. The lower DC link voltage may increase the electrical load placed on output terminals of the generator 14, which may result in the generator 14 providing an increased restraining torque at the shaft of the rotor 13 of wind turbine 12. The additional restraining torque may cause the angular speed $\omega_t$ of the wind turbine 12 to drop, so that kinetic energy stored in the rotating masses of the wind turbine 12 is converted into electrical power. The kinetic energy stored in the rotating components of the wind turbine 12 may thereby be tapped to actively supply the grid 18 with additional power during the transient event. By mapping this transfer of kinetic energy to a synthetic inertial response curve determined by the synthetic inertial response signal generator 38, the central controller 15 may provide improved transient stability to the grid 18 in a similar (or improved) fashion as would be provided by the flywheel effect of a synchronous machine.

In block 134, the central controller 15 compares the current angular velocity of the wind turbine $\omega_t$ to the reference threshold velocity $\omega_{ref}$. If the current angular speed $\omega_t$ of the wind turbine 12 is not below the reference threshold velocity $\omega_{ref}$ as represented by segment 108 of wind turbine angular speed 91 between times $t_2$ and $t_4$, ("No" branch of decision block 134) the central controller 15 proceeds to block 136 where the recovery flag is cleared (if set) or remains cleared (if not set) before proceeding to block 142. From time $t_2$ to time $t_7$, as energy is transferred from the kinetic energy stored by the wind turbine 12 to electrical energy in the grid 18, the angular speed $\omega_t$ may drop with advancing time over the period as represented by segment 113 of wind turbine angular speed 91. The kinetic energy available to generate the inertial response of the wind turbine system 10 may thereby be depleted while the central controller 15 maintains the wind turbine system 11 in the inertial response mode.

At about time $t_4$, sufficient energy may have been transferred to the grid 18 so that the angular velocity $\omega_t$ drops below the reference threshold velocity $\omega_{ref}$. When the angular velocity $\omega_t$ drops below the reference threshold $\omega_{ref}$ ("Yes" branch of decision block 134), the central controller 15 may proceed to block 138 where the recovery flag is set (if clear) or remains set (if not clear) before proceeding to block 140, as represented by the change in the level of the recovery flag state 92 at time $t_4$. From time $t_4$ to $t_6$, the central controller 15 may continue to output $\Delta P_{inertia\_ref}$, so that the power output controller 22 continues transferring kinetic energy from the wind turbine 12 to the grid 18, which may cause the angular speed of the wind turbine $\omega_t$ to continue to drop with advancing time over the period.

In block 140, the central controller 15 compares the current angular velocity of the wind turbine $\omega_t$ to the minimum allowable angular speed $\omega_{min}$. If the current angular speed $\omega_t$ is not below the minimum allowable angular speed $\omega_{min}$, ("No" branch of decision block 134) the central controller 15 remains in the inertial response mode and proceeds to block 142.

In block 142, central controller 15 checks the status of the inertia flag. If the inertial flag remains set, ("Yes" branch of decision block 142), the wind power system 10 is still in an inertial response mode, and the central controller 15 remains in the inertial response process loop 144 by returning to block 134. The central controller 15 may thereby remain in an inertial response process loop 144 so long as the inertia flag remains set and the angular velocity $\omega_t$ of the wind turbine remains above the minimum allowable angular speed $\omega_{min}$. In the current operational example, the angular speed $\omega_t$ of the wind turbine 12 remains above the minimum allowable angular speed $\omega_{min}$ for the duration of the inertial response, as represented by segment 113 of wind turbine angular speed 91. The central controller 15 may therefore continue to transfer kinetic energy from the wind turbine 12 to the electrical grid until time $t_6$ when the inertia flag state is cleared.

At about $t_6$, $\Delta P_{inertia\_syn}$ may cross zero, indicating that the angular frequency of the internal reference voltage $\omega_i$ has dropped below the angular frequency of the grid $\omega_g$. This event may cause the central controller 15 to clear the inertia flag, which signals that the wind power system 10 has exited the inertial response mode. In response ("No" branch of decision block 142), the central controller 15 may proceed to block 146.

In block 146, the central controller 15 checks the status of the recovery flag for the wind turbine system 11. If the recovery flag is set ("Yes" branch of decision block 146) as in our example, the central controller 15 proceeds to block 128 and disables the inertia flag for the wind turbine system 11 in question. In block 148, the central controller 15 causes the wind turbine system 11 to enter a recovery mode during which the angular speed $\omega_t$ of the wind turbine 12 is allowed to recover. Because the inertia flag is disabled, the wind turbine system 11 in question may not respond if the inertia flag is set while the wind turbine system 11 is in the recovery mode. Relieved from having stored kinetic energy transferred to the grid 18, the angular speed $\omega_t$ of the wind turbine 12 may begin to increase with advancing time at time $t_6$. At about time $t_7$, the angular speed $\omega_t$ of the wind turbine 12 may exceed reference threshold speed $\omega_{ref}$ ("No" branch of decision block 148), which may cause the central controller 15 to proceed to block 150 and clear the recovery flag, returning the wind turbine system 11 to normal operation.

Figure 9:
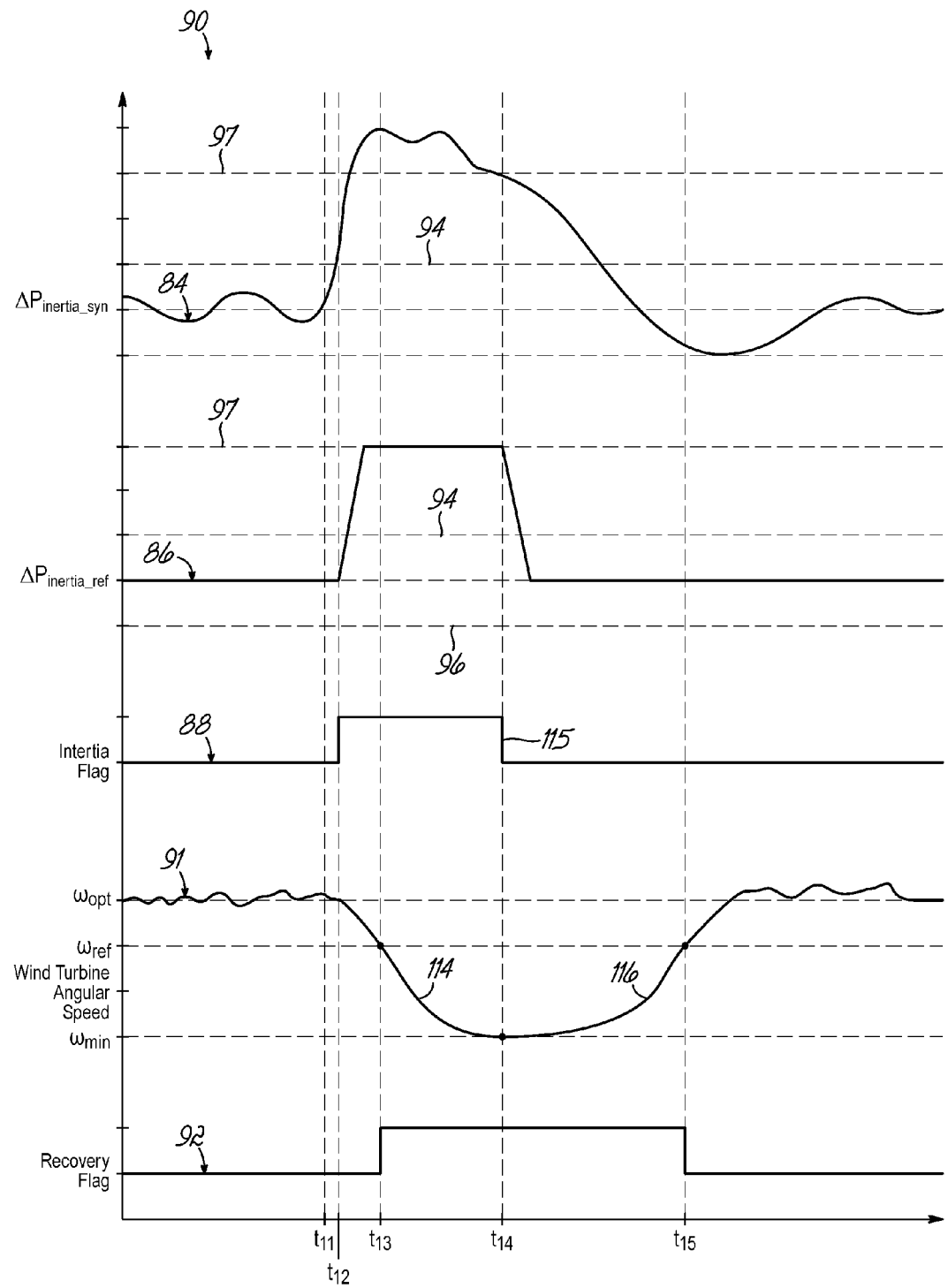
FIG. 9 is a graphical diagram illustrating the relationship between the synthetic inertial response signal, the inertial response reference signal, an inertia flag state, a recovery flag state, and the wind turbine rotor angular speed when the speed of the rotor drops to a minimum allowable threshold in accordance with an embodiment of the invention.

Referring now to FIG. 9 in which like reference numbers refer to like features in FIGS. 7 and 8, if a grid power imbalance event results in a synthetic inertial response of sufficient duration and magnitude, the angular speed $\omega_t$ of the wind turbine 12 may drop below the minimum angular speed $\omega_{min}$ while the central controller 15 is in the inertial response mode. In response to $\omega_t$ dropping below $\omega_{min}$, the central controller 15 may cause the power output controller 22 for the wind turbine system 11 in question to exit the inertial response mode to prevent damage to the wind turbine 12. To this end and in similar fashion as described with respect to FIGS. 7 and 8, the wind power system 10 may initially be operating under normal conditions.

At time $t_{11}$, the grid 18 may experience a significant power imbalance, which may causes $\Delta P_{inertia\_syn}$ to begin increasing with advancing time. At time $t_{12}$, $\Delta P_{inertia\_syn}$ may exceed the dead band upper limit 94, causing the central controller 15 to set and enable the inertial flag and enter the inertial response process loop 144. As $\Delta P_{inertia\_ref}$ increases in a similar fashion as described in reference to FIG. 7, the power output controller 22 may begin increasing the power supplied to the grid 18 above the pre-event power level $P_0$. The resulting transfer of power to the grid 18 from the stored kinetic energy of the rotating components of the wind turbine 12 may result in the angular speed $\omega_t$ of the wind turbine 12 dropping with advancing time as represented by segment 114 of wind turbine angular speed 91.

At about time $t_{13}$ the angular speed $\omega_t$ of the wind turbine 12 may drop below $\omega_{ref}$ ("Yes" branch of decision block 134) so that the central controller 15 proceeds to block 138 were the recovery flag state, as represented by recovery flag state 92, may be set before proceeding to block 140. While the central controller 15 remains in the inertial response mode, the angular speed $\omega_t$ of the wind turbine 12 may continue to drop with advancing time until the angular speed $\omega_t$ reaches the minimum allowable angular speed $\omega_{min}$ ("Yes" branch of decision block 140) at about time $t_{14}$.

The central controller 15 may then proceed to block 128 where the inertia flag is disabled for the wind turbine 12 in question, as represented by segment 115 of inertia flag state 88. Disabling the inertia flag may cause the central controller 15 to ramp $\Delta P_{inertia\_ref}$ down toward zero at the maximum rate permitted by the ramp rate limiter 80. In response, the power output controller 22 may reduce the amount of power supplied to the grid 18 to the level controlled by the power set point signal 40, which may no longer be frozen at the pre-event level. The central controller 15 may then proceed to block 148, which may cause the wind turbine system 11 to enter a recovery mode as previously described in reference to FIGS. 7 and 8.

While the wind turbine system 11 was in the inertial response mode, the power set point 40 may have dropped because of the aforementioned droop in the voltage on the DC link 28. Due to the lower power demand on the generator 14 resulting from the lower power set point 40, the restraining torque provide by the generator 14 may be lower than the aerodynamic torque provided by the rotor 13 while the wind turbine system 11 is in recovery mode. The angular speed $\omega_t$ of the wind turbine 12 may thereby increase with advancing time in recovery mode as represented by segment 116 of wind turbine angular speed 91.

At $t_{15}$, the angular speed $\omega_t$ of the wind turbine 12 may again exceed reference threshold speed $\omega_t$ ("No" branch of decision block 148), which may cause the central controller 15 to proceed to block 150 and clear the recovery flag, which may return the wind turbine system 11 to normal operating conditions. The wind turbine system 11 may now be ready to provide a synthetic inertial response to the next electrical grid power imbalance.

Figure 10:
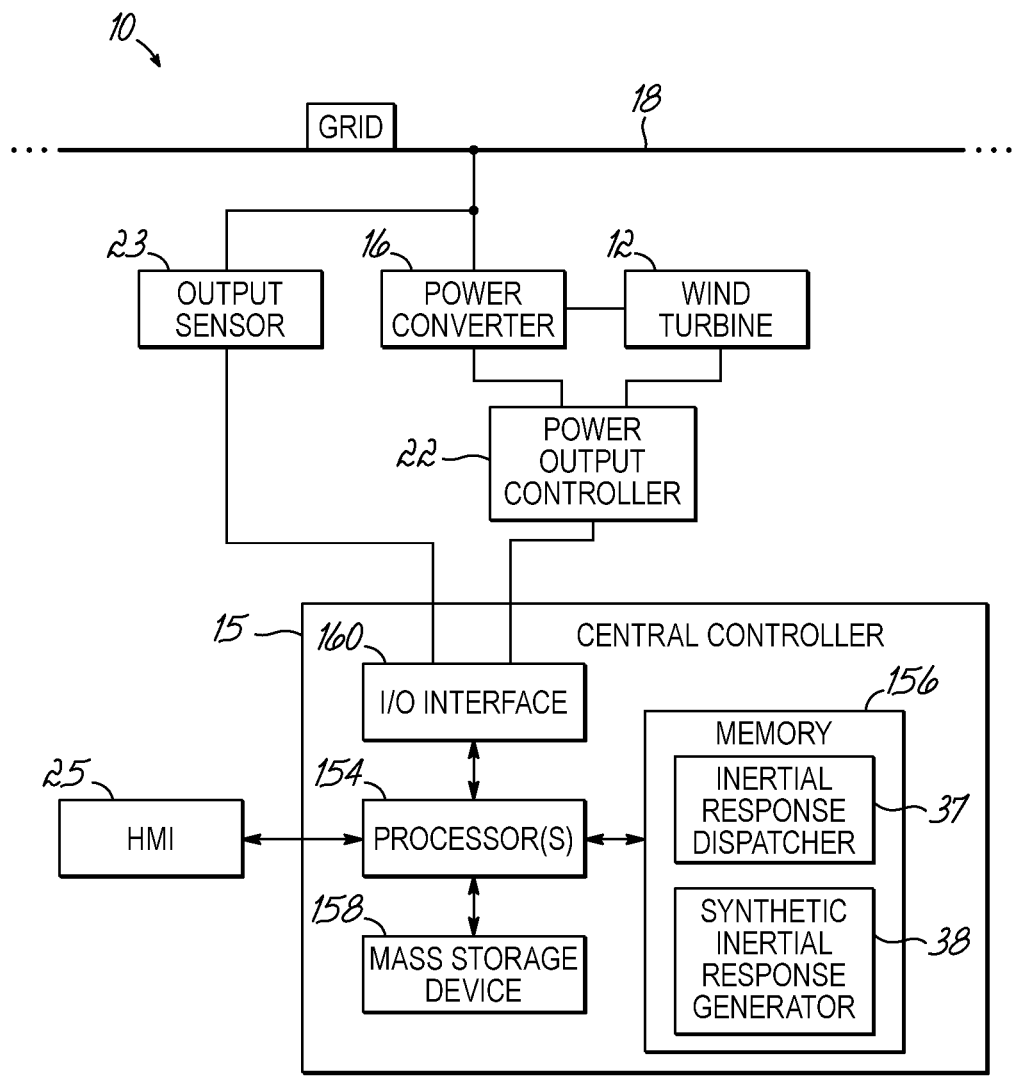
FIG. 10 is a diagrammatic view of the power output controller, wind turbine, and electrical grid.

With reference to FIG. 10 and in accordance with an embodiment of the invention, a representative implementation of the central controller 15 is shown operatively connected with the power output controller 22, and an output sensor 23. The output sensor 23 may be configured to provide information about the grid voltage and current being supplied from the power converter 16 to the central controller 15 in a form suitable for use by an electronic circuit, such as a digital logic or low power analog circuit.

The central controller 15 may be implemented using one or more processors 154 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 156. Memory 156 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information. Mass storage device 158 may be a single mass storage device or a plurality of mass storage devices including but not limited to hard drives, optical drives, tape drives, non-volatile solid state devices and/or any other device capable of storing digital information. An Input/Output (I/O) interface 160 may employ a suitable communication protocol for communicating with the power output controller 22, and output sensor 23.

Processor 154 may operate under the control of an operating system, and executes or otherwise relies upon computer program code embodied in various computer software applications, components, programs, objects, modules, data structures, etc. to read data from and write instructions to the power output controller 22 and output sensor 23 through I/O interface 160, whether implemented as part of the operating system or as a specific application. The resident computer program code executing on central controller 15 as a set of instructions may include the inertial response dispatcher 37 and synthetic inertial response generator 38, as well as other functions and/or programs that are not shown. As previously discussed, the central controller 15 may use the synthetic inertial response generator 38 to produce a synthetic inertial response by the wind power system 10 in response to load imbalances in the electrical grid 18. Other functions within the synthetic inertial response generator 38 may also reside in memory 156, so that each block in central controller 15 and the power output controller 22 in FIGS. 1, 2, 3, 4, 5, 6 and 8 may represent code executable in the processor(s) 154. The processor(s) 154 may thereby control multiple aspects of the wind power system 10. Although shown operatively coupled to a single wind turbine 12, the central controller 15 may be coupled to a plurality of wind turbines comprising a wind power system 10. The central controller 15 may thereby be configured to control the conversion of the kinetic energy stored in each wind turbine 12 on an independent basis to control total wind power system output in a coordinated way to optimize the synthetic inertial response at a plant level.

The HMI 25 may be operatively coupled to the central controller 15 in a known manner. The HMI 25 may include output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the power output controller 22. The HMI 25 may implemented on a separate unit or computer so that the central controller 15 may be managed remotely.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of" or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, embodiments of the invention may be used with power generation systems having sources other than or in addition to a wind turbine, such as a storage battery. Therefore, the invention in its broader aspects should not be limited to the specific details, representative methods, and illustrative examples shown and described. Accordingly, departures may be made from such details without departing from the spirit or scope of the general inventive concept.

What is claimed is:

1. A method for controlling a power output from a wind power system coupled with an electrical grid, wherein the wind power system comprises a wind turbine having a rotor, the method comprising:
monitoring, at a connection point of the wind power system with the electrical grid, a grid voltage of the electrical grid;
generating an internal reference voltage having an angular frequency and a phase angle;
comparing a phase angle of the grid voltage to the phase angle of the internal reference voltage to generate a quadrature component of the grid voltage;
generating, based on the quadrature component of the grid voltage, a synthetic inertial response signal representing a desired inertial response to be provided to the electrical grid by the wind power system;
applying, responsive to a magnitude of the generated synthetic inertial response signal exceeding a non-zero predefined threshold value, a power offset signal to a power set point signal of the wind power system, wherein the power offset signal includes the synthetic inertial response signal as a component;
monitoring an angular speed of the rotor;
in response to the angular speed of the rotor falling below a reference threshold, setting a recovery flag indicating that the rotor has insufficient kinetic energy to provide an inertial response;
in response to the synthetic inertial response signal exceeding the predefined threshold value, setting an inertia flag indicating that the wind power system is providing an inertial response to the electrical grid; and
performing one of:
enabling the inertia flag when the recovery flag is clear; and
disabling the inertia flag when the recovery flag is set.

2. The method of claim 1, wherein generating the internal reference voltage having the angular frequency and the phase angle comprises:
generating a feedback signal from a mathematical product of the angular frequency of the internal reference voltage and a transfer function of a damping circuit;
subtracting the feedback signal from the synthetic inertial response to generate a difference signal;
multiplying the difference signal by a gain constant to generate an amplified difference signal;
integrating the amplified difference signal to generate the angular frequency of the internal reference voltage; and
integrating the angular frequency of the internal reference voltage to generate the phase angle of the internal reference.

3. The method of claim 1, wherein generating the synthetic inertial response signal based on the quadrature component of the grid voltage comprises:
filtering the quadrature component of the grid voltage to produce a conditioned quadrature voltage;
multiplying the conditioned quadrature voltage by a synchronous reactance power quotient to produce a synchronous power output; and
subtracting an inertial response power reference point from the synchronous power output to generate the synthetic inertial response signal.

4. The method of claim 1, further comprising:
processing the synthetic inertial response signal through an inertial response reference generator to generate an inertial response reference signal; and
determining the power offset signal based on the inertial response reference signal.

5. The method of claim 4, wherein processing the synthetic inertial response signal through the inertial response reference generator further comprises: processing the synthetic inertial response signal through at least one of a gain scheduler, a dead band limiter, a ramp rate limiter, and an absolute limiter.

6. The method of claim 1, further comprising: in response to the angular speed of the rotor decreasing below a minimum threshold, disabling the inertia flag.

7. The method of claim 1, wherein generating a synthetic inertial response signal is based on a predefined parameter indicating a sensitivity of the wind power system to changes in the phase angle of the grid voltage, and wherein the predefined parameter is independent of the grid voltage and of an impedance of the electrical grid.

8. The method of claim 7, wherein the predefined parameter comprises a synchronous reactance power quotient, and wherein the synchronous reactance power quotient is determined without measuring parameters of a synchronous machine and without modeling a response of the synchronous machine.

9. A method of generating a synthetic inertial response signal using a wind turbine power generation system, wherein the wind turbine power generation system comprises a wind turbine having a rotor, the method comprising:
sampling a grid voltage at a connection point;
generating an internal reference voltage having an angular frequency and a phase angle;
synchronizing, using a control loop of the wind turbine power generation system, the phase angle of the internal reference voltage to a phase angle of the grid voltage;
calculating, using the control loop, an error signal between an inertial response power reference point and a synchronous output power of the wind turbine power generation system;
applying, responsive to determining that a magnitude of the error signal exceeds a non-zero predefined threshold value, a power output adjustment to the wind turbine power generation system, wherein the power output adjustment is based on the error signal;
monitoring an angular speed of the rotor;
in response to the angular speed of the rotor falling below a reference threshold, setting a recovery flag indicating that the rotor has insufficient kinetic energy to provide an inertial response;
in response to the synthetic inertial response signal exceeding the predefined threshold value, setting an inertia flag indicating that the wind turbine power generation system is providing an inertial response to the electrical grid via the power output adjustment; and
performing one of:
enabling the inertia flag when the recovery flag is clear; and
disabling the inertia flag when the recovery flag is set.

10. The method of claim 9, wherein the control loop is configured to generate a step response such that the error signal produced in response to a change in the phase angle of the grid voltage produces a synthetic inertial response signal from the wind turbine power generation system.

11. The method of claim 9, wherein the synthetic inertial response signal is configured to counter a change in the grid voltage.

12. A wind power system for providing power to an electrical grid, the wind power system comprising:
   one or more wind turbine systems, wherein each wind turbine system includes:
      a rotor,
      a generator coupled to the rotor, and
      a power converter coupling the generator with the electrical grid at a connection point, wherein the power converter is configured to transfer at least a part of the generated power from the wind turbine to the electrical grid; and
   a central controller operatively coupled to the one or more wind turbine systems, the central controller configured to:
      generate a synthetic inertial response signal representing a desired inertial response to be provided to the electrical grid by the wind power system;
      apply, responsive to a magnitude of the synthetic inertial response signal exceeding a non-zero predefined threshold value, an adjustment to a power output provided by the one or more wind turbine systems, wherein the adjustment to the power output is based on the magnitude of the synthetic inertial response signal; and
      set an inertia response flag in response to the synthetic inertial response signal exceeding the predefined threshold value, the inertia response flag indicating that the wind power system is providing an inertial response to the electrical grid,
   wherein each wind turbine system of the one or more wind turbine systems further comprises:
      an inertial response controller configured to, in response to an angular speed of the rotor of the associated wind turbine system decreasing below a reference threshold, set a recovery flag indicating that the rotor of the wind turbine system has insufficient kinetic energy to provide an inertial response, and
   wherein the inertial response controller is further configured to:
      disable the inertia response flag for the associated wind turbine system when the recovery flag is set and the inertia response flag is set.

13. The system of claim 12, wherein the one or more wind turbine systems comprises a plurality of wind turbine systems, wherein the central controller is further configured to: generate, for each wind turbine system of the plurality of wind turbine systems, a respective inertial response reference signal.

14. The system of claim 12, wherein the inertial response controller is further configured to: disable the inertia response flag for the associated wind turbine system in response to an angular speed of the rotor decreasing below a minimum threshold.

* * * * *